United States Patent
Wielenga (10) Patent No.: US 11,791,056 B2
(45) Date of Patent: Oct. 17, 2023

(54) SYSTEM THAT MOVES LIQUID FUEL INTO AND OUT OF A NUCLEAR REACTOR CORE TO CONTROL REACTIVITY

(71) Applicant: Thomas J Wielenga, Hollywood, FL (US)

(72) Inventor: Thomas J Wielenga, Hollywood, FL (US)

( * ) Notice: Subject to any disclaimer, the term of this patent is extended or adjusted under 35 U.S.C. 154(b) by 0 days.

(21) Appl. No.: 17/685,324

(22) Filed: Mar. 2, 2022

(65) Prior Publication Data
US 2023/0282376 A1    Sep. 7, 2023

(51) Int. Cl.
| G21C 7/22 | (2006.01) |
| G21C 3/54 | (2006.01) |
| G21C 15/12 | (2006.01) |
| G21C 15/02 | (2006.01) |

(52) U.S. Cl.
CPC .......... *G21C 7/22* (2013.01); *G21C 3/54* (2013.01); *G21C 15/12* (2013.01); *G21C 15/02* (2013.01)

(58) Field of Classification Search
CPC .......... G21C 7/22; G21C 3/54; G21C 15/12; G21C 15/02
USPC .......................... 376/212, 221, 328
See application file for complete search history.

(56) References Cited

U.S. PATENT DOCUMENTS

| 2,902,424 A | | 9/1959 | King | |
| 2,999,060 A | * | 9/1961 | Teitel | G21C 7/22 376/212 |
| 3,041,263 A | | 6/1962 | Kiehn et al. | |
| 3,378,456 A | * | 4/1968 | Roberts | G21C 15/24 376/277 |
| 3,510,399 A | * | 5/1970 | Terasawa | G21C 7/22 376/328 |
| 4,083,225 A | * | 4/1978 | Day | G01N 29/032 73/19.03 |
| 5,139,735 A | * | 8/1992 | Dillmann | G21C 7/22 376/328 |
| 2006/0146976 A1 | * | 7/2006 | Emin | G21C 7/22 376/328 |
| 2022/0051818 A1 | | 2/2022 | Cisneros, Jr. et al. | |

OTHER PUBLICATIONS

Grimes, Molten-Salt Reactor Chemistry, Nuclear Applications & Techonology, vol. 8, Feb. 1970, pp. 137-155, http://www.egeneration.org/wp-content/Repository/Nuclear_Applications_and%20Technology_Technical_Briefs/NAT_MSRchemistry.pdf.

Historic Molten Salt Reactor Experiment Brochure, Oak Ridge National Laboratory, 1965-1972, 16 pages, https://web.archive.org/web/20160303211133if_/https://dl.dropboxusercontent.com/u/15726934/Historic_Molten_Salt_Reactor_Experiment_Brochure_ORNL_1965-1972.pdf.

(Continued)

*Primary Examiner* — Jack W Keith
*Assistant Examiner* — Daniel Wasil
(74) *Attorney, Agent, or Firm* — Endurance Law Group PLC (57) ABSTRACT

A nuclear reactor controlled by moving a liquid fuel between a reservoir and chambers in the core is provided. No pumps or moving parts within the reactor vessel are needed to move the fuel. The control system moves the liquid fuel between the core and the reservoir by moving a separate control gas. It can monitor the internal state of the core through the control connections. The fuel chamber is shaped so that evolved gases escape the core and can be collected at the control connections. The core reverts to a safe state on power failure.

15 Claims, 9 Drawing Sheets

(56) References Cited

OTHER PUBLICATIONS

Nuclear Innovation Alliance, Advanced Nuclear Reactor Technology: A Primer, Sep. 2021, 44 pgs. https://nuclearinnovationalliance.org/sites/default/files/2021-10/ANRT-APrimer_September.pdf.
Renault, Introduction to Nuclear Reactor Design, Gen 4 International Forum, CEA/INSTN, France, Nov. 22, 2016, 38 pages, https://www.gen-4.org/gif/upload/docs/application/pdf/2016-11/genivwebinar_clauderenault_introduction-nuclear-reactor-design.pdf.
Scott, The Stable Salt Reactor—Safer, Cleaner and Cheaper, Moltex Energy, International Energy Agency, 2015 World Energy Outlook, 38 pages, https://www.nuclearinst.com/write/MediaUploads/NI_webinar_-_Dr_Ian_Scott_-_MSRs.pdf.
Wikipedia, Molten-Salt Reactor Experiment, retrieved on Mar. 2, 2022, 10 pages, https://en.wikipedia.org/wiki/Molten-Salt_Reactor_Experiment.
Wikipedia, Stable Salt Reactor, retrieved on Mar. 2, 2022, 7 pages, https://en.wikipedia.org/wiki/Stable_salt_reactor.
Canadian Nuclear Society, Manitoba Branch, Whitehall Reactor No. 1 (WR-1) Design Details, retrieved on Nov. 21, 2022 from https://web.archive.org/web/20050325170728/http:/www.cns-snc.ca/history/wr-1/wr-1_4.html, 3 pages.
International Search Report and Written Opinion for Application No. PCT/US23/062806, dated Aug. 28, 2023, 12 pages.

\* cited by examiner

Figure 1 Reactor overview

Figure 2. Simplified Control Schematic

Figure 3. Purge tube

Figure 4 Neutron absorption control

Figure 5 Gas oscillator

Figure 6. Annular core with reservoir

Figure 7. Helical tube core with multiple helical reservoirs

Figure 8 Reactor vessel with annular core

Figure 9. Annular cylinder chamber with jets

SYSTEM THAT MOVES LIQUID FUEL INTO AND OUT OF A NUCLEAR REACTOR CORE TO CONTROL REACTIVITY

FIELD OF THE INVENTION

The present invention relates to nuclear reactors, their fueling, control, construction, and safety. In particular, a nuclear reactor that is controlled by moving liquids in its core and the fueling and the controlling of the reactor in a safe and convenient way. The envisioned design is compact, simple to operate, safe, and simple and inexpensive to construct.

BACKGROUND OF THE INVENTION

Nuclear reactors are reliable generators of electric power that is carbon free. However, they have complex designs, are difficult to build, and are viewed with suspicion by the public. Most designs involve high pressure water and steam that is heated by the core and require huge pressure vessels to contain the core and the pressure. Having high pressures inside a nuclear reactor core gives rise to the fear of an explosion with nuclear fallout. Large containment facilities are required to contain any accidental release.

Most current designs have their fuel in the form of fuel pellets that are sealed inside metal capsules and then stacked inside tubes. These tubes are then arranged inside the reactor core in fixed positions. Control rods are lowered or raised depending on the power needs of the reactor. This requires mechanical control over the control rods in a very hostile nuclear environment. Also, the fuel pellets have a limited life because of gas build-up within them and nuclear damage to their structure. Gaseous products of the nuclear reactions build up inside the clad pellets and create extreme pressure. This limits their life, and the gases can also adversely affect the reactivity of the fuel. The solid fuel is also damaged by radiation, limiting its life. Managing the fuel requires periodic shutdowns for mechanical removal and replacement.

A design that does not involve high pressures and the corresponding concerns uses a salt at a temperature high enough that it becomes a liquid. These molten salts are usually fluorides or chlorides of metals. The fissile fuel is a molten salt and is mixed with a carrier salt. One proposed design (the Stable Salt Reactor) replaces the fuel pellets in the tubes with a molten salt fuel. The tubes are sealed on one end but have a vent on the top. Since the fuel is a molten salt, gaseous products of the nuclear reactions that are most radioactive (Cesium) react with the fluorides and become salts mixed in with the carrier salt. Unreactive noble gases (Xenon) bubble out of the liquid. The fuel tubes are still arranged similarly to conventional reactors and mechanical methods to move the fuel tubes in the reactor are required. The design has a high negative temperature coefficient of reactivity. This means as the temperature goes up the reactivity goes down and reaction is self-limiting. Heat removed from the system causes the temperature to drop and the reactivity to increase, bringing the temperature back up. It is claimed that it should be able to operate without continuous control.

In an early experimental Molten Salt Reactor (MSRE), the fuel was pumped around a circuit through the reactor core (which was a larger chamber) where the nuclear fuel reacted and heated the molten salt. The molten salt was then pumped to a heat exchanger where the heat was removed and then the cooled salt was returned to the reactor core. This design was simple but involved pumping a high temperature radioactive liquid through pipes. Hot radioactive piping presents problems for maintenance and the areas through which the pipes run. This piping also increases the amount of fuel needed for the reactor because fuel is distributed throughout the primary cooling system. And the core had a fixed size and adjustment was done with control rods. The reactor ran stably for a period of years with little trouble.

One natural advantage for molten salt reactors is that they are stable. That is, when the salt heats up, its density decreases, its reactivity and heat production is reduced, and this results in stable operation even when the load changes. It is also easy to add fuel to them. In the case of the MSRE, fuel could be added or sampled through a port in the circuit. Gaseous products were removed in the MSRE by spraying the molten salt in a chamber so the gases could leave the liquid.

The salts used in Molten Salt Reactors have high melting temperatures and very high boiling temperatures. The high temperatures at which they are liquid are suitable for efficient conversion of heat energy to electrical energy and are still within the temperature range of available construction materials.

One of the disadvantages to molten salt reactors is that the salt is not as conductive of heat as might be desired. This makes it more difficult to remove heat from the salt. This is one reason that the salt was pumped around a circuit in the MSRE. This put the salt into more contact with the pipes in the heat exchanger and allowed the salt to transfer its heat to the pipes which then transferred the heat to a secondary cooling fluid.

BRIEF SUMMARY OF THE INVENTION

In the present invention, a nuclear reactor is controlled by moving liquids. A liquid being moved (a primary liquid) may be the fuel for a reactor such as a liquid fuel like a molten salt. Or the primary liquid could be a neutron absorbing fluid like molten Hafnium tetrachloride. Or the primary liquid could be a neutron reflector like molten lead. Or the reactor may have several primary liquids being controlled. Each primary liquid is moved by a control fluid that is in contact with the primary liquid. Each control fluid is less dense than its primary fluid, does not mix with its primary fluid, and is less radioactive than its primary fluid. The control fluid may be a gas such as Helium.

In each case, the primary liquid is contained in separate passages from other primary liquids in or around the reactor core. Typically, these passages are tubes. If a primary fluid is a liquid fuel, the passages for the liquid fuel in the core are shaped to allow any evolved gases to travel upward and out of the core where they can be disposed of.

For each primary fluid, the passages in the core are connected to one or more reservoirs outside the core but inside the reactor vessel. The primary liquid is moved between the reservoirs and the passages in the core by the movement and pressure of the control fluid. Between a reservoir and a passage in the core is a "trap." This is a low point that is always filled with the primary liquid. This ensures that the primary liquid is moved between reservoir and the core and not the control fluid.

In each case the reservoir and core passages are connected to a control system outside the reactor vessel. These connections (also typically tubes) are filled with the control fluid. The control fluid interfaces between each primary liquid and the control system. The control system moves each control fluid which, in turn, moves each primary liquid.

The nuclear reactor may have any combination of primary liquids: liquid fuel, liquid neutron absorber, or liquid reflector, within it. The nuclear reactor's reactivity can be controlled by moving liquid fuel into or out of the core, by moving a liquid neutron absorber into or out of the core, or moving a liquid neutron reflector away from around the core, or by some combination of these control avenues. It has many advantages, including simplicity and intrinsic safety.

In still another aspect of the present invention, a nuclear reactor having a core, a reactor vessel, a circulation system and a second cooling system is provided. The core has passages for a primary cooling fluid. The reactor vessel contains the core and the primary cooling fluid. The circulation system circulates the primary coolant through the core and against or along the reactor vessel walls. The circulation system transfers a majority of the heat from the core to the reactor vessel walls. The secondary cooling system in contact with the exterior of the reactor vessel walls transfers the heat to an energy conversion system.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 1. Overview of reactor vessel with core. The core (1) has region control tubes (9) exiting the cover that are used to set levels of fuel in the core. A toroidal fuel reservoir (3) is shown below the core. There is a reservoir control tube (8) for controlling fluid level in the reservoir. There is also a drain tube (7) for filling or draining fuel from the reactor core (1). Also shown is an absorber reservoir (14) that holds neutron absorbing fluid for controlling the reactor. The reactor vessel (2) is a tank that holds a primary coolant fluid. The coolant fluid circulates upward through the core (1) and down the sides of the reactor vessel (2). The reactor vessel is wrapped with heat exchanger tubes (4) for a secondary coolant that provides heat to an electrical generator (not shown). A motor (10) driven impeller (12) above the core draws primary coolant upward and then impels it outward to the reactor vessel walls and then downward along the walls. Fins (5) attached to the vessel walls aid in transferring heat to the vessel walls. Coolant then circulates back to the center and up through the core. A natural draft emergency air cooler surrounds the vessel. The emergency air outlet (11) is connected to a chimney for natural draft cooling. The emergency air inlet (13) is connected to ambient outside air.

FIG. 2. Simplified Control Schematic. A compressor (23) between the low-pressure storage tank (22) and high-pressure storage tank (21) maintains a higher pressure in the high-pressure tank. Check valve (20) allows flow around compressor (23) if compressor fails. The volume and pressure of control gas in each region of the core (1) is controlled by a region control valve (26). Reservoir control valve (27) controls the volume and pressure of control gas above the reservoir (3). These valves are controlled by an electronic control system (not shown). The pressure sensors (28) measure the pressures above core regions and reservoir. The pressure in each region, relative to the reservoir pressure, gives a measure of the height of the fuel in that region. Measurements of fuel heights is also determined acoustically by height sensors (29). An oscillator (24) provides varying volumes of control fluid to the passage regions to move fuel in the core. The valves are shown in their emergency shutdown positions. During shutdown, excess flow valves (25) prevent gas blow-by if a region empties before another region. This helps maintain pressure for a speedy shutdown.

FIG. 4. Neutron absorption control methods. Control fluid flow into the region control ends (43, 44) pushes neutron absorbing control fluid out of core (1). Control fluid flow into the absorber reservoir control end (42) pushes absorber into the core. Opening control valves on both control ends (42, 43) and absorber reservoir control (42) returns neutron absorber fluid to the core. Neutron absorber fluid is stored in a high reservoir where it can run down into the core for a "normally-off" condition. Straight tube vertical control (44) acts similarly to control rods in conventional reactors but work bottom-up instead of the usual top-down. In the example curved tube, neutrons are absorbed near the middle of the core when absorber flows into the core.

FIG. 5. Gas oscillator. A driver for the oscillating flow can be a modified engine or compressor in which the crankshaft has equally spaced cranks. Rotating the crankshaft (52) causes alternating pressures/flows spaced equally. A motor (51) drives the crankshaft. In this oscillator there are three equally spaced phases.

FIG. 7. Helical tube core with multiple helical reservoirs. The central section (72) of this core consists of 3 helixes. The lower control ends of these helixes pass up through the center of the core and help concentrate fuel in the core. Four of the remaining helix cores have tube reservoirs consisting of a helix that has a larger diameter than the corresponding core helix and a larger pitch. These tube reservoirs together store enough fuel to make the core dormant. The reservoir ends (73) are used to set levels in the individual tube reservoirs. The region control ends (74), together with the reservoir ends, set the level of fuel in core helixes. The remaining three helix (with ends 75, 76) are used for relatively fixed storage and do not have reservoirs and are not used for control.

DETAILED DESCRIPTION OF THE INVENTION

With reference to the drawings and in operation, the present invention, provides a nuclear reactor 100. The fissile fuel is a liquid (or particles suspended in a liquid) that is moved into and out of the core by pushing a control fluid into or out of either the reservoir end or the other end of the passages that pass through the core. The difference in pressure between the two ends of the passages moves the liquid in the passages. For convenience, one end will be called the reservoir end and the other a region control end. The region control end is the end where pressure pushes liquid fuel out of the core. The reservoir end is the end in which pressure pushes liquid out of the reservoir (and into the core). Both ends are involved in control and both ends terminate outside the reactor vessel in a control system.

Figure 1:
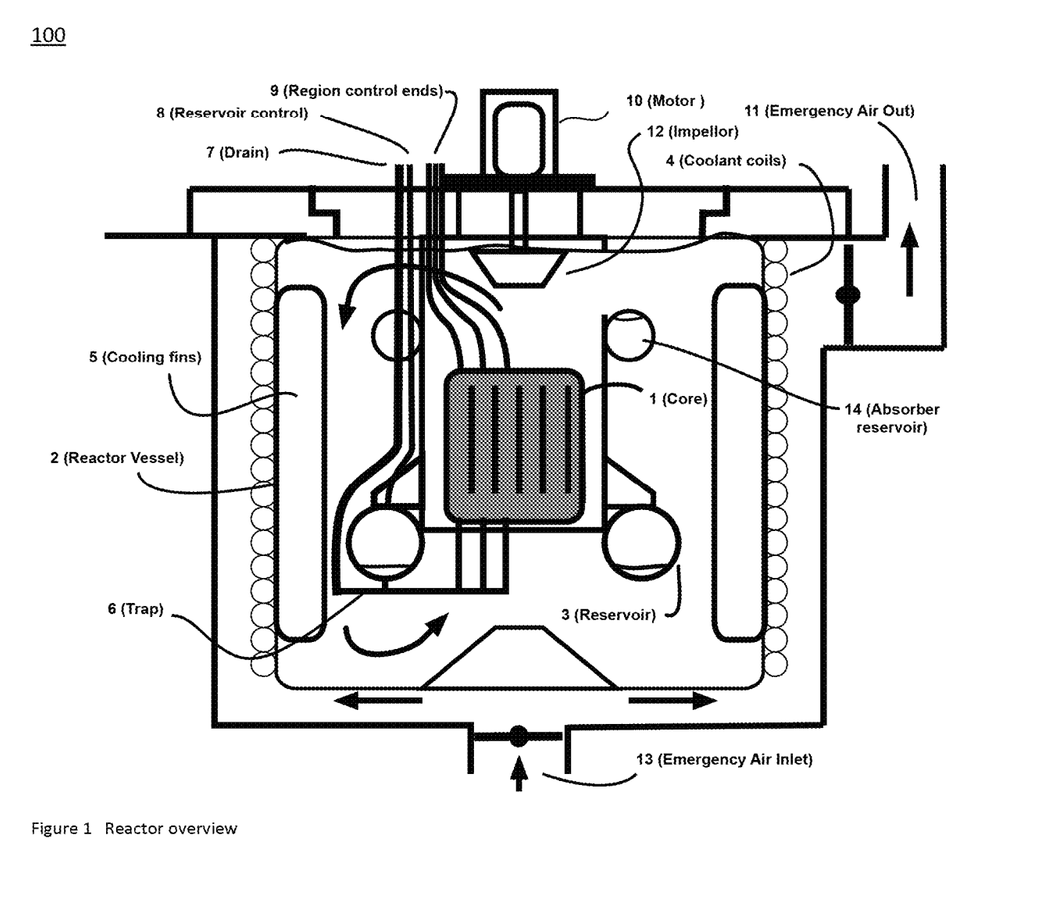

A typical design stores some of the liquid fuel below the core in a reservoir. See FIG. 1. The reactor 100 can be started by pushing control fluid (typically a gas) into the top of the reservoir. This pushes fuel out of the reservoir and up into the core. To remove fuel from the core, control fluid is allowed out of the reservoir and control gas pushed into the region control end and this, with an assist from gravity, moves the liquid out of the core and back into the reservoir. Control flows into the two ends can be modulated to push fuel into, or drained from, the core to increase or decrease the reactivity and therefore modulate the heat production of the core. If flow is allowed out of the reservoir end, the fuel flows back to the reservoir and the reactor reverts to a dormant, safe condition. Alternating flows can be applied to the control ends to agitate the fuel within the core to increase heat conduction and assist in evolved gas removal.

The heat produced by the core is transferred away from the core by a separate heat transfer fluid. This cooling fluid is most likely another molten salt but could be other fluids such as high temperature gas, a molten metal such as sodium or lead, or pressurized water or steam.

Figure 3:
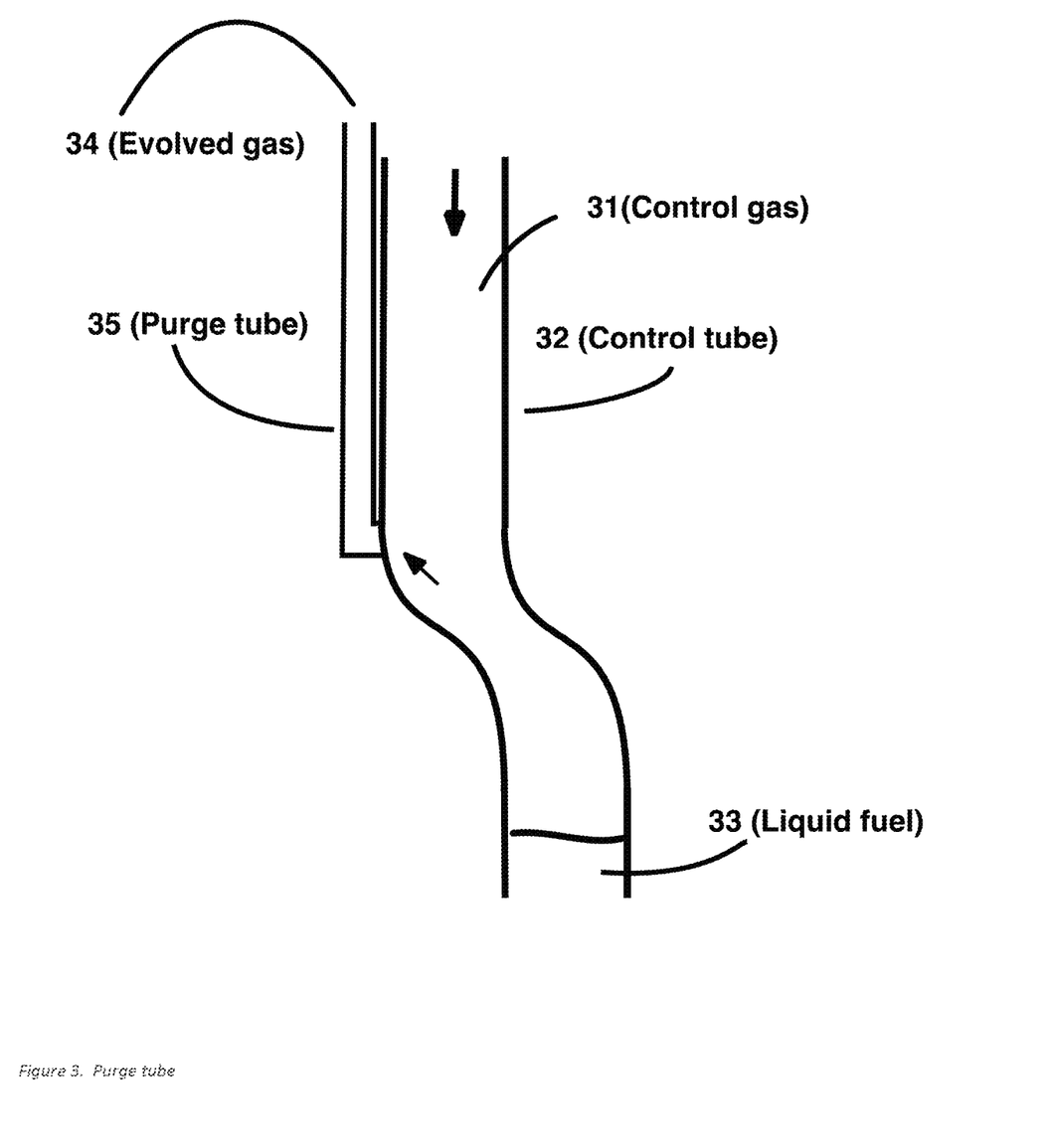
FIG. 3. Purge tube. A purge tube (35) is ported to a control tube (32). The purge tube is used withdraw reaction product gases (34) above the fuel in the control tube at the top of the reactor.

The products that evolve in the fuel form either salts in the liquid or a noble gas. Xenon-135 gas could accumulate in the passages and negatively affect the reactivity of the core. Therefore, the passages in the core are shaped so that the gas can travel upward and out to be collected. The gas can be allowed to decay in the reactor vessel but outside the core without it affecting the reactivity of the core. The gas will be relatively heavy compared to a control gas and tend to stay near the core where it can absorb a neutron and therefore become stable and remain a gas instead of becoming radioactive Cesium. It can be removed via purge tubes. See FIG. 3.

Holding fuel in a reservoir below the core in the cooling liquid has the advantage of keeping the fuel blanketed by the coolant with its radioactive shielding and the intrinsic safety of its weight seeking the lowest point. The reservoir should hold enough fuel to make the core subcritical. It must also spread the fuel out so that it is nonreactive while in the reservoir and can be cooled by the cooling fluid.

The reservoir should be below the core so that fuel will run down into the reservoir even with the loss of both control pressure and controller power. Control pressure could be lost, for example, if the compressor (21) were to fail.

Between the reservoir and passages in the core is a "trap." This is a low point that is always filled with liquid so that pressure on the fuel in the reservoir pushes the fuel down into the trap and then up into the core before any control fluid.

The trap may also be connected to a drain line that can be used to remove fuel from the reservoir. Pressure on the reservoir and sufficient flow of control fluid may be used to blow fuel through the drain line and up and out of the reservoir. This can be used, for example, for removal of fuel for reprocessing.

Some passages may not have a reservoir below them. For example, passages containing a fertile fuel may surround or be imbedded in the core for breeding purposes. A fertile fuel does not contribute significantly to the criticality of the core, so these passages do not need a reservoir below them. Since it is likely that the core can be made subcritical without draining all the passages containing fissile fuel, some fuel passages may not need to drain to a reservoir. If a liquid moderator is used in the core, it would not need a reservoir below as well.

To drain passages without reservoirs, differential pressure on the ends and sufficient flow is used to blow out the liquid from the passages.

Reactivity can also be controlled by moving a liquid that absorbs neutrons into or out of a core. This may be used, as in the case here of a reactor with liquid fuel but may also be used in a conventional reactor with fixed fuel. This simplifies the design of reactors with fixed fuel by removing the mechanical control system.

For passages containing a liquid neutron absorbing fluid, control fluid is pushed into the region control end to push the control fluid down out of the core to increase reactivity. If control valves are opened the absorbing fluid returns to the core to reduce reactivity. For neutron absorbing control fluids, the reservoir for the fluid would be above the reactor core so the fluid would naturally flow down into the core, even with the loss of both control pressure and controller power, thereby increasing safety.

Adding a reflector around the core can increase the number of neutrons involved in fission and reduce the amount of fuel needed in the core. Having a liquid neutron reflecting liquid such as molten lead in passages around the core allows for another control method for reactors. Moving reflector liquid away from around the core allows more neutrons to escape and reduces the number of neutrons involved in fission. This reduces the reactivity of the core.

Fuel Level Control

Figure 2:
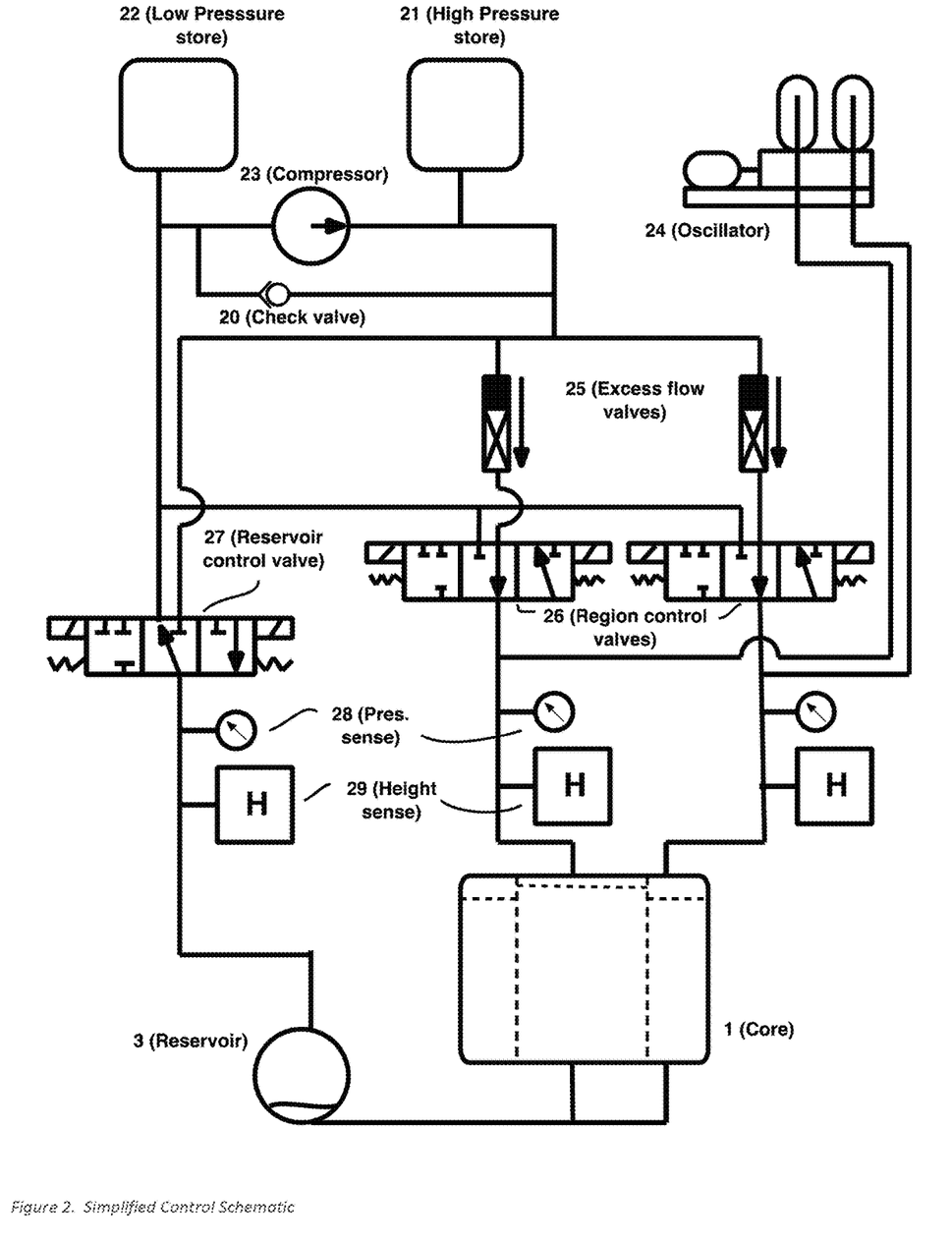

To control the amount of fuel in the reactor control fluid flows into the passages and the reservoir are controlled. The basics of the control system are shown in FIG. 2. Since the control fluid (typically a gas) may be radioactive, the system is closed and not open to the atmosphere. A gas supply tank charges the system with the control gas (not shown). A compressor creates a differential pressure between a low-pressure store (22) and the high-pressure store (21). Flow of control gas into and out of the region control ends is controlled by region control valves (26). Flow into and out of the reservoir is controlled by the reservoir control valve (27). Pressures are read by pressure sensors (28) and the differences between region pressures and reservoir pressure is a measure of the height of the fluids in that region of the core (1). The heights of fluids are also measured acoustically by height sensors (29).

There may be many region control valves. In one aspect of the present invention, each region control valve may have three positions:

a. A safe position to which the valve reverts with a loss of control power. In this position flow is allowed into the region to push the fuel in the core downward and out. This is an emergency shutdown position. It is also used during normal operation to lower the level of the fuel in this region and reduce reactivity.

b. A normal running position in which the control ends are blocked and there is no flow into or out of the region through the valve. This is the normal position while the reactor is running.

c. A fill position in which control gas is allowed out of this region of the core. This would raise the level of fuel in this region and increase reactivity.

The reservoir control valve (27) may have three positions:

a. A safe position to which the valve reverts with a loss of control power. In this position gas flow is allowed out the reservoir to allow fuel into the reservoir. This is an emergency shutdown position.

b. A normal running position in which the control ends are blocked and there is no flow into or out of the reservoir through the valve.

c. A core fill position in which control gas flow is pushed into the reservoir. This would raise the level of fuel in all regions of the core by pushing fuel out of the reservoir and into the core.

The height of the fuel in a passage can be measured (29) acoustically through its region control end tube. A resonant tone measures the length of the gas in the region control end tube and therefore the distance to the liquid. The height can also be measured by timing the reflection of a sound wave off the fuel. The height as measured by pressure differences is directly affected by the density of the liquid. Comparing these two height measurements gives a measurement of the density of the fluid and therefore its temperature. The amount of fuel in the core, its density, and its temperature can all be measured through the tubes. This can give a more accurate picture of the distribution of mass, density, and temperature in the core, all made from measurements outside the core.

Calculations of fuel height, volume, density, and temperature would be accomplished by an electronic controller. An electronic controller would also adjust control gas flows and pressures, and, in turn, the reactivity and power generation of the core based on these values and others such as neutron flux detectors, heat exchanger temperatures, and power demand.

Check valve (20) allows flow around the compressor in case the compressor fails, and the reactor goes into shutdown. Without an assist from control fluid pressure, gravity can still move fuel to the reservoir. Reservoir and region control valves (27, 26) would be in their default open positions. The check valve (20) allows control fluid past the compressor thereby allowing fuel to flow into the reservoir. This provides a fail-safe and helps make the reactor intrinsically safe.

Fuel Agitation and Circulation

It may be desirable to agitate the fuel in the passages to improve heat transfer, to maintain homogeneity of the fuel, or to assist in the evolution of waste gas to the ends. An oscillating flow can be introduced into the control ends by an oscillator (24), see FIG. 2. To develop an alternating flow of a liquid fuel, a convenient method is a reciprocating piston in a cylinder. See FIG. 5. The common arrangement of a crankshaft and connecting rod driving a piston inside a cylinder is a well-developed method of producing alternating pressures and flows. This method is more efficient than creating alternating pressure/flows by operating the region control valves (26). It minimizes the flow of gas from the high-pressure store and requires a nearly constant power input to the oscillator.

Figure 5:
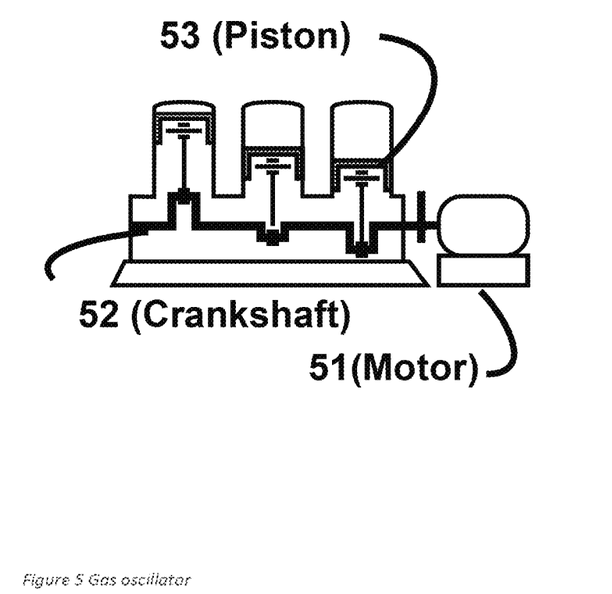

A simple driver for the alternating pressures/flows is a three-cylinder arrangement with a crankshaft having three equally spaced cranks 120 degrees apart. Each cylinder is connected via tubing to the corresponding control end. One rotation of the crankshaft would cause each piston to complete a cycle, pushing gas out and drawing it back in.

More than one reservoir commonly connected to core passages is possible and may be desired. Having several reservoirs allows fuel to be moved from one part of the core to another or to promote nearly continuous mixing of fuel from different core regions without the fuel being removed from the vessel. An alternating pressure driver on the reservoirs would promote continuous mixing of the fuel from all connected core regions.

To more closely couple flows from the oscillator to the movement of fuel in the passages, the bias pressure in the core may be raised by raising the reservoir pressure as well as the pressure in all the regions.

Liquid Control Fluid Considerations

Another strategy for better coupling of oscillator to fuel movement is to use a liquid control fluid. A liquid control fluid is less compressible than a gas control fluid and would provide very good coupling for oscillation. The control system would need to be adapted to move liquids instead of gases.

Instead of a compressor (23) a pump would be used to pump the liquid from a low-pressure store (22) to the high-pressure store (21). The high-pressure store (21) would be an accumulator so that as liquid was pumped into it the pressure would rise.

Purging Evolved Gas

Each fuel region control may need a way to purge the evolved gas from the tube. This is made possible by a purge tube that removes gas from the control tube near the reactor core. See FIG. 3. Since evolved gases are heavy, a light control gas like Helium will concentrate the evolved gas above the core. These gases can be allowed to stay above the reactor core and absorb a neutron. They can be removed via the purge tube when desired.

If a control liquid is used to move the liquid fuel in the core instead of a gas, the evolved gas may need to be trapped near the core and removed from a gas trap. The trap could be as simple as bending the control tube in an "S" shape (on its side). A purge tube would withdraw evolved gases from the trap as needed.

Basic Tube Shapes for the Core

One possible basic core design is to make the passages for the core out of tubes. Tubes are easy to make, easy to bend into complex shapes, strong, and easily inspected. They withstand pressures easily and allow for good heat transfer because of their large surface area to volume of fuel. There are many shapes for tubes that allow for evolved gas to travel up and out. Basic designs for tubes into include u-tubes, helixes, and spirals.

U-Tubes

U-tubes can be used for the core. Both arms of the "U" could be within the core, or one could be outside the core. If an arm is outside the core, the bottom of the U can function as a reservoir. Typically, the bottom of the "U" would be sloped downward toward the core arm and function as a trap and reservoir.

When the pressures on the two ends of the "both-in" u-tube are equalized, the fuel flows to the lowest point. This would tend to keep fuel together and reactive. "Both-in" U-tubes are suitable for areas of the core where fuel need not be drained to a reservoir, or for moderators, fertile fuel, or neutron absorbers.

U-tubes connected at the bottom can form a forest of vertical tubes within the core. Here one arm is in common to the connected u-tubes and is typically outside of the core.

Helical Coils

A helical coil core can be made up of helical coils of increasing radius stacked around each other. The overall core shape would be cylindrical, but each helix can have a different height. Taller helixes in the center of the core can make a core that is nearly spherical.

Each helix may be individually controlled. The major advantage of the helical coil is that the height increases monotonically from the bottom to the top. This allows evolved gases to pass out of the core with less agitation.

Figure 7:
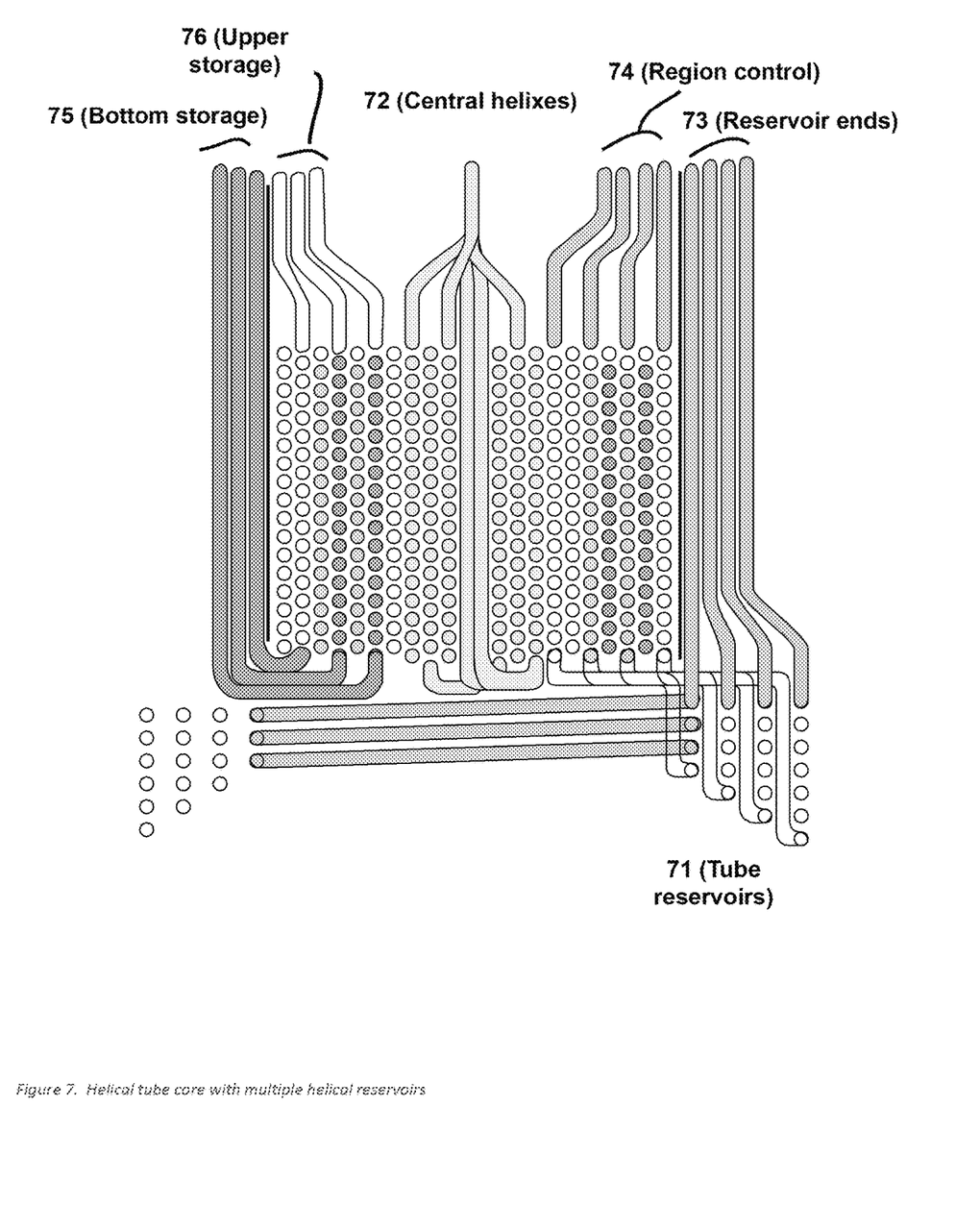

Helical coils can also be used as reservoirs. These coils could be like the core helix, or could have a larger diameter, or a larger pitch. See FIG. 7 for an exemplar helical tube core with multiple helical reservoirs.

Helical coils can also be used for neutron absorption and control. An absorber helix would likely be positioned between fuel helixes. Such a helix can shut down a reactor by cutting off the outer portions of the core from inner portions.

Spirals

This uses a minimum number of tubes (as few as one) to form an entire core. The spiral layers are essentially one level, but the layers are stacked upward. The spiral layers are connected at the center and at the outer edge. The tubing does not increase monotonically like a helix does, but it never decreases in elevation either. To ensure that gases escape, alternating flow should be introduced into the tubing to work the gases to the center or the ends where the gases can transition upward. This oscillating flow will assist in moving gas bubbles upward to the next level and so on until they reach a region control end.

Spirals are particularly useful for liquids that do not evolve gases and are fixed in place such a reflectors and moderators. A series of spirals could be used with a reflector liquid such as lead to reflect neutrons at the top and bottom of the core, while still allowing coolant to pass through.

Tube Attachments

Along with these designs, the tubes themselves can be intertwined by twisting two or more tubes together. In addition, tubes can be attached directly to others by welding or brazing. For example, tubes used for fuel may be attached to tubes containing moderators, or coolant.

Cylindrical Annulus Core Design

Figure 8:
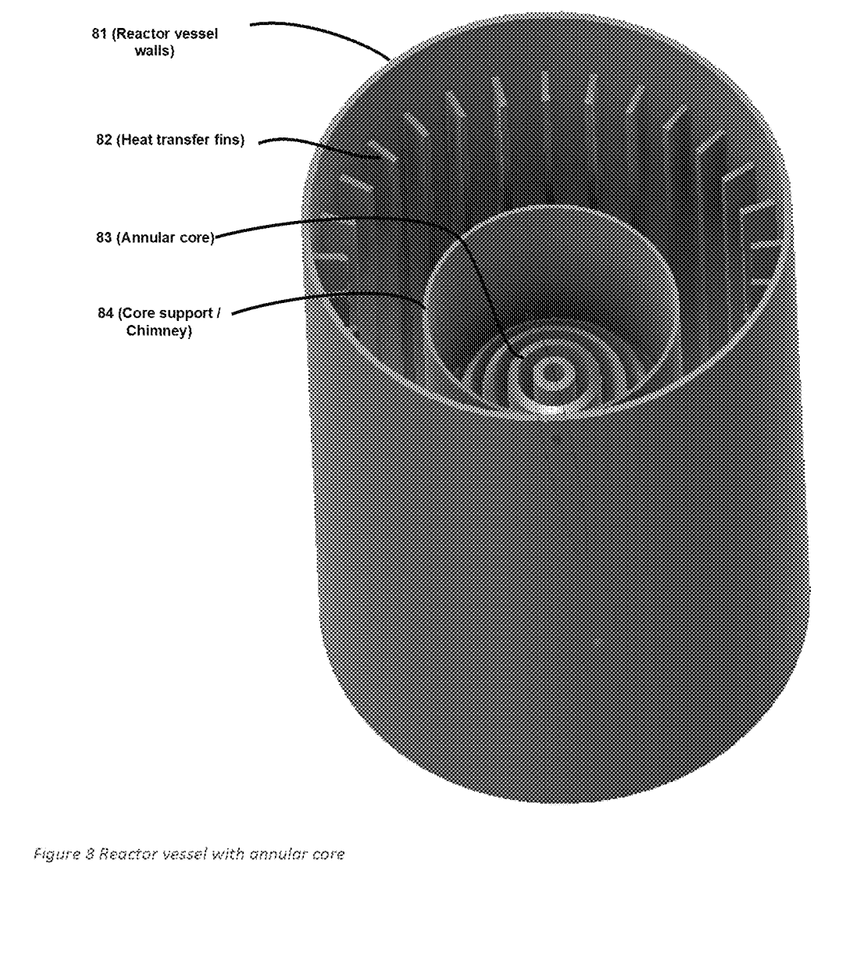
FIG. 8. Reactor vessel with annular core. A perspective of the reactor vessel walls (81) with attached heat transfer fins (82). At the center is an annular core (83) whose outline is approximately spherical. The core support/chimney supports the annular core, reservoirs and control tubes and forms a chimney to assist in the flow of the primary cooling fluid up through the core.

Another basic design is to make the core out of cylindrical annuluses. A series of annuluses are stacked within each other. Coolant would flow between the annuluses. Each annulus might be controlled independently. See FIGS. 6 and 8.

The annuli can have different heights so that the core outline has a more spherical shape and better for minimizing the amount of fuel in the core.

Fluid Circulation

Flow inside an annulus may be desired because of potential stratification of the fuel, for instance when TRISO particles are suspended in a liquid. This may also be possible in molten salt fuels where the Uranium salt is much denser than the carrier salt. In addition, it may be desired for better heat transfer of fuel to annulus walls.

Figure 9:
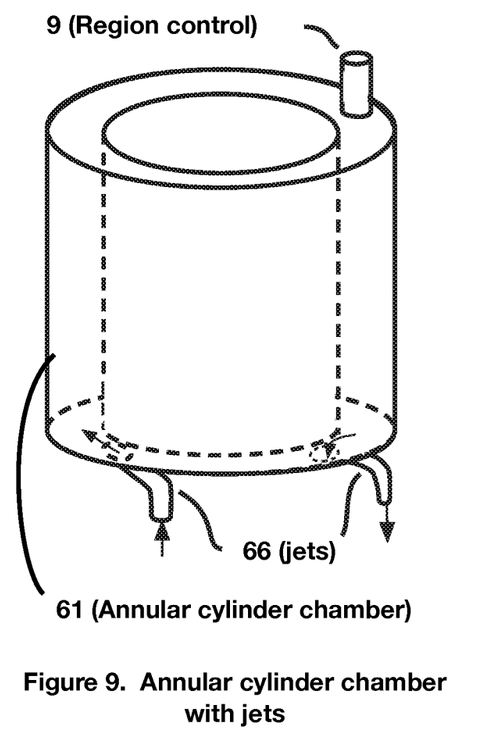
FIG. 9. Reactor vessel with annular cylinder and a plurality of jets arranged to produce a circulatory flow around the annular cylinder.

To make larger consistent flows in the annulus, a circulating flow can be induced. The flow travels around the core in a continuous circular manner. This does not require any mechanical connection to the exterior of the reactor and is done through the tubes connecting to the annulus. To accomplish this, a set of jets (66) (preferably three or more, but at least two) are equally spaced around the annulus. Flow is encouraged around the annulus by angling the jets (66) into the annulus in the direction of desired circulation. Momentum of the fluid exiting the jet (66) will carry the fluid around the annulus on the injection phase, while during the withdrawal phase fluid is drawn from around the jet. The net result is flow around the annulus. These flows also cause an evenly phased alternating pressure to travel around the annular core section. A continuous flow is induced in the annulus that continuously flows from the high pressure toward the low pressure. With at least three connections (3-phases), a nearly constant flow can be induced around the annular core section.

The jets (66) may be arranged around the bottom of the annulus, or there may be a series of jets arranged vertically to induce flow higher in the annulus as well.

Control by Neutron Absorption

Control of a nuclear reactor using a similar control system to that used for a liquid fuel can be accomplished using a neutron absorbing liquid. This could also be used in more conventional nuclear reactors where the fuel is fixed. The liquid absorber would take the place of control rods that are moved into or out of the core to absorb neutrons and control the reactor. In this case the liquid absorber's reservoir would be above the reactor's core so that absorber would flow down into the core to stop the reactor. Valves would default to pushing absorber into the core on loss of controller power. In case of compressor (20) failure a check valve (20 allows control fluid to flow past the compressor and allows gravity to pull absorber into the core.

Figure 4:
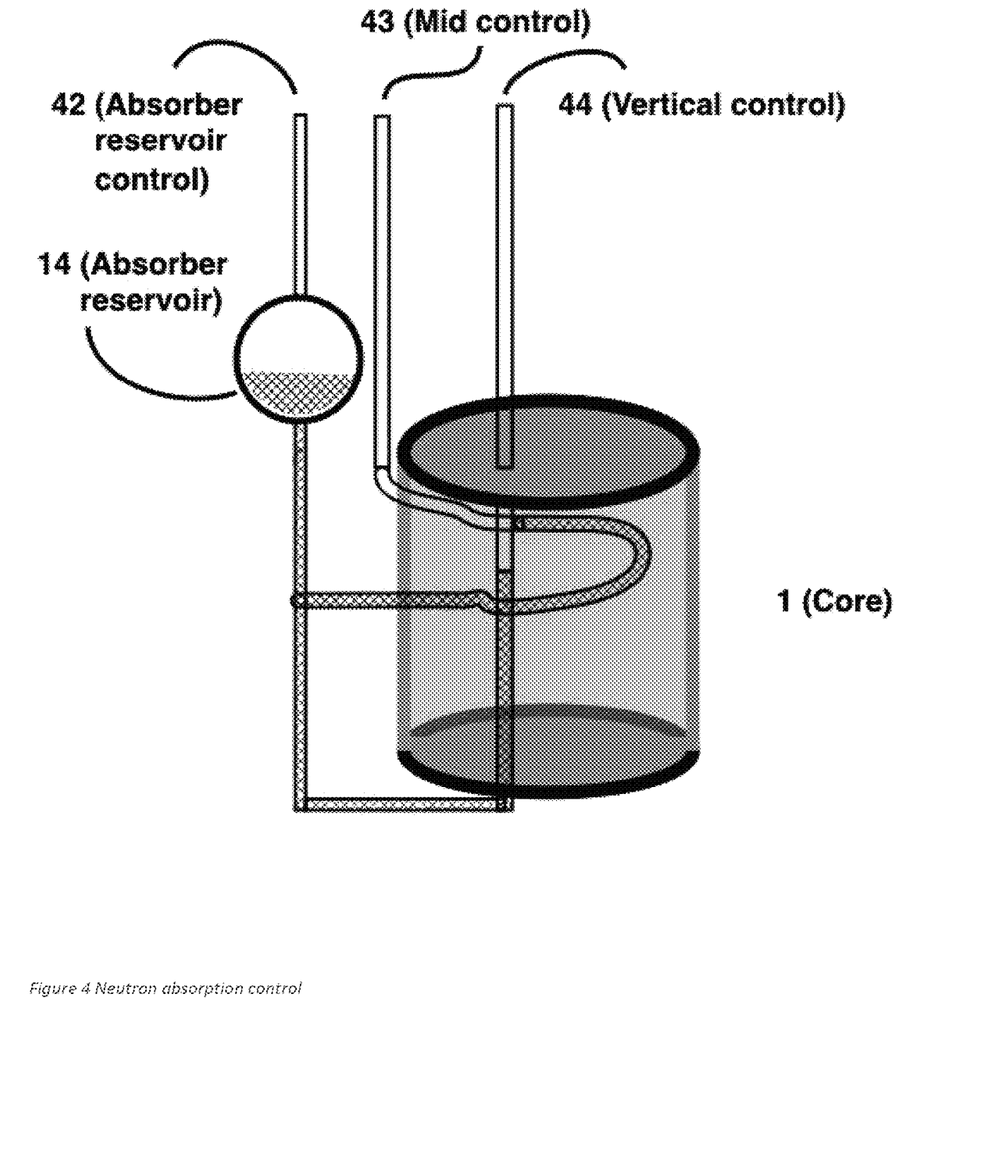

Two examples of simple types of liquid neutron absorption control are given in FIG. 4. It illustrates ways to add neutron absorption to a core. A vertical tube acts like a control rod of a conventional reactor. Many of these tubes can be connected to the absorber reservoir and individually controlled.

The helical tube near the middle shows how different shapes can be used to tailor the reactivity of the core. In this case absorption removes neutrons near the middle of the core.

One possible neutron absorbing liquid is the molten salt Hafnium tetrachloride.

Figure 6:
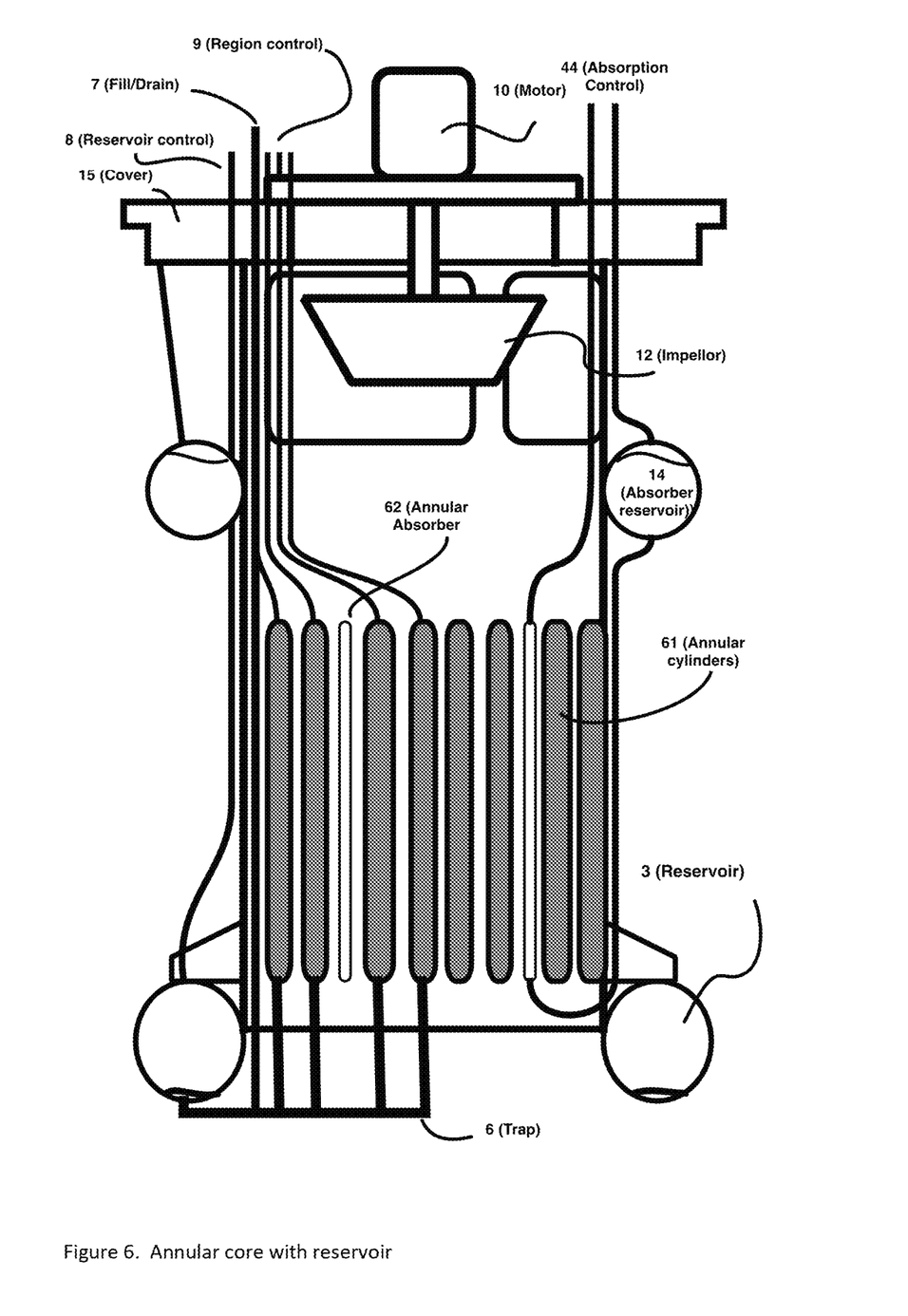
FIG. 6. Annular core with reservoir and region control. The annular core is made of nested annular cylinders (61) with toroidal reservoir (3) below. The reservoir has a reservoir end tube (8) that pushes fluid up into the core. A fill/drain tube (7) allows for draining the core and reservoir. Individual region control end tubes (9) are used to set levels in the four annular cylinders. Annular spaces between annular cylinders allow for cooling the core. An annular absorber (62) is positioned between the second and third annular core cylinders. Absorber fluid is maintained in the absorber reservoir (14) and controlled at the absorber control ends (44).

FIG. 6 shows an example reactor having both fuel and absorber control. In this case the absorber is an annulus that cuts off the interior of the reactor core from the outer portion.

Control by Neutron Reflection

The reactor may also have neutron reflectors to redirect neutrons back toward the core so that they can generate reactions instead of being lost to the core. This is done so that less fuel is needed to sustain reactions. Molten lead held in passages or chambers around the core may serve that purpose. If the neutron reflector is stored in passages at the edges of the core instead of fixed chambers, it is possible to modulate the reactivity of the core. Allowing the neutron reflector to flow out of the passages and into a reservoir allows neutrons to escape from the core and for reactions to decrease. This can be used to control the reactor using a similar control system as that shown for the liquid fuel system but adapted to a liquid reflector.

Reflectors can be conveniently located around the sides the core. For instance, molten lead can serve in an annulus around the exterior of the core to reflect neutron back into the core to reduce fuel needs and to reduce radioactivity outside the core and vessel. A helix around the core could also serve this purpose.

Multiple spirals at the top and bottom of the core can also be used to reflect neutrons back into the core. If the spirals gradually increase in height from center to edge (or vise-versa) instead of being flat, they drain and fill monotonically. Reflection can be removed gradually starting either at the center or the edges of the spiral depending on the slope.

Industrial Applications—Advantages

The present invention, as discussed above, is directed towards a nuclear reactor 100 that may be controlled via movement of one or more primary liquids. A primary liquid may be a liquid fuel, a liquid neutron absorber, or a liquid neutron reflector. Movement of each primary liquid is controlled by a control system.

The advantages to this invention may include:
a. The reactivity and power of the reactor can be controlled by modulating a control fluid at a region control end and reservoir end of control tubes.
b. The reactor goes into shutdown in the event of major system failures such as controller power failure or compressor failure making it much safer.
c. Reaction products can be collected and disposed of without the buildup of pressures in the fuel.
d. No penetrations in the reactor vessel are needed for control rods. This makes the head room above the reactor much smaller and safer. Sliding joints in the reactor are unneeded.
e. There is little or no pressure on the reactor vessel making it safer. The reactor vessel can be made of much thinner materials, reducing their cost.
f. The reactor vessel can be a sealed unit with a cover. The cover, however, can be made removable for maintenance.
g. Only minor pressures are needed for controlling the level of the fuel in the reactor core or for adjusting control fluids. This reduces the thickness of the tubes needed and reduces concerns about damage to the tubes from nuclear bombardment.
h. The amount of fuel needed for the reactor is less than that for a molten salt reactor that pumps its fuel around a circuit and through a heat exchanger.
i. Adding fuel to the reactor during operation is simple. The liquid fuel is either added to a reservoir end or a region control end on the exterior of the reactor vessel. The fluid then would flow down into the reactor and supplement existing fuel.
j. Fuel can easily, quickly, and safely be removed from the reactor. A drain tube can be fitted to the reservoir at its lowest point. Pressure and sufficient flow of control gas through the ends can push the fuel up and out of the reactor. For passages without a reservoir drain, applying pressure with a sustained flow of gas to one end will blow the fuel out the corresponding opposite end into a retaining vessel.
k. Increasing temperature of the fuel leads to decreased fuel density and therefore increased specific volume. The shape of the core and passages can be made so that this increase in volume pushes fuel from the core reducing its reactivity and further stabilizing the reactor. This is an advantage over other reactors where the mass of the fuel in the core is constant.
l. The power level of the reactor can be changed as well as its reactivity by arranging fuel in the core.
m. The arrangement and density of fuel in the reactor can be modified during operation. Passages can be arranged in sets with separate reservoirs and fuels with differing compositions used in these differing sets. For example, a second load of fuel in an independent section can add power to the reactor. Or the same fuel can be moved from the center of the core to outer regions of the core.
n. As the reactor's fuel is modified by reactions and its reactivity changes, the composition of the fuel can be changed without shutdowns. Fuel can be added or removed quickly and easily while the reactor is running.
o. The distribution of mass, density, and temperature of the fuel in the core can be made from measurements outside the core using the reservoir and region control end tubes.
p. A breeder reactor can be devised by adding passages for a fertile liquid in and around the reactor core.
q. Breeding material can be removed from the reactor easily for reprocessing into fuel by blowing the liquid out of the breeder passages into a receptacle.
r. The design can be adapted for either a thermal reactor or for a fast reactor. A burner reactor is possible as well as a breeder reactor.
s. By removing the Xenon 135 from the core, the reactor can be more responsive. The neutron absorption of Xenon-135 then does not affect the reactivity of the core. Delays due to waiting for it to decay are not necessary. Startup from standby is quicker and safer because Xenon is removed from the core as it evolves and therefore does not remove neutrons and inhibit reaction. Decay to a non-absorbing form can be accomplished outside the core but still inside the reactor vessel.
t. Because the reactor is compact and the tank and core can be manufactured off-site, the design can be a "small modular reactor" (SMR). The core and tank can be built and tested off-site and then loaded with fuel at the site. All components can be small enough to be trucked to the site.

Ideas to Protect

The following ideas are to be protected:
a. A nuclear reactor having a core with passages containing liquid fuel with connections to control, fill, or drain the fuel.
b. A nuclear reactor core controlled using a liquid neutron absorbing fluid in core passages.
c. A nuclear reactor that has liquid fertile fuel within core passages.
d. A nuclear reactor that is controlled using liquid neutron reflectors.
e. A nuclear reactor that controls fuel level with control flows and pressures.
f. A nuclear reactor that agitates the liquid fuel within the core.
g. A nuclear reactor core made of tubes.
h. A nuclear reactor core made of cylindrical annular passages.
i. A nuclear reactor with a reservoir below the core to hold fuel for control and for pacification.
j. A nuclear reactor with a reservoir above core for neutron absorbing fluids for control and pacification.
k. A nuclear reactor with U-tube core passages.
l. A nuclear reactor with Helical coil tubing core passages.
m. A nuclear reactor with Spiral coil tubing core passages.
n. A reactor that uses alternating fluid pressures/flows for fuel agitation.
o. The method of detecting fuel level, density, and activity by acoustic means.
p. A nuclear reactor where a motor and pistons are used for oscillation of pressures/flows.
q. A nuclear reactor where circulation of fuel in the core is induced using oscillating pressures and flows.
r. A nuclear reactor where evolved gases are purged from control tubes near the core.
s. A nuclear reactor with a coolant system where one or more impellers force a heat transfer fluid to circulate between the reactor core and the reactor vessel walls that are, in turn, cooled by a second coolant.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A nuclear reactor comprising:
a core with a fuel chamber therein containing a liquid fuel;
a region control passage connecting the top of the fuel chamber with a control system;
a reservoir outside of the core also containing the liquid fuel;
a lower connecting passage connecting a bottom of the fuel chamber with a bottom of the reservoir, the lower connecting passage including a trap located at a low point of the lower connecting passage between the reservoir and the fuel chamber to prevent passage of a control fluid between the reservoir and the fuel chamber;
a reservoir control passage between a top of the reservoir and the control system, the control system configured to move the liquid fuel between the fuel chamber and the reservoir by displacing the liquid fuel with the control fluid through the region control passage and reservoir control passage, the control system configured to monitor a volume of the liquid fuel in the fuel chamber and adjust the volume of the liquid fuel to control a reactivity of the nuclear reactor, where the fuel chamber, the lower connecting passage, and the reservoir are configured to allow evolved gases from the liquid fuel to move to the top of the fuel chamber or the top of the reservoir; and,
a cooling system configured to move a coolant fluid through a coolant passage in the core.

2. A nuclear reactor as in claim 1 wherein the fuel chamber passage is composed from coiled tubing.

3. A nuclear reactor as in claim 1 wherein the control system measures a height or volume of the liquid fuel in the fuel chamber or reservoir by height sensors in the region control connection the reservoir control connection, respectively.

4. A nuclear reactor as in claim 3 wherein the height sensors measure acoustic properties of at least one of (1) the control fluid in the region control passage and the fuel chamber and (2) the control fluid in the reservoir and reservoir control passage.

5. A nuclear reactor as in claim 1 wherein the liquid fuel is a molten salt.

6. A nuclear reactor as in claim 1 wherein the liquid fuel is a liquid with suspended fuel particles.

7. A nuclear reactor as in claim 1 wherein the control system is configured to produce alternating flows of the control fluid through the region control passage to produce alternating flows of the liquid fuel in the fuel chamber.

8. A nuclear reactor as in claim 7 wherein the alternating flows are produced by a piston in a cylinder.

9. A nuclear reactor as in claim 1 wherein the fuel chamber is an annular cylinder.

10. A nuclear reactor as in claim 9 wherein the annular cylinder has a plurality of jets arranged around an interior of the annular cylinder; the jets configured to induce flow of the liquid fuel around the interior of the annular cylinder.

11. A nuclear reactor as in claim 1, wherein the liquid fuel includes a liquid neutron moderator.

12. A nuclear reactor as in claim 1, wherein the liquid fuel includes a liquid neutron reflector.

13. A nuclear reactor as in claim 1, wherein the control fluid is a gas.

14. A nuclear reactor comprising:
a core having an associated primary passage in the shape of an annular cylinder, the primary passage containing a liquid fuel, wherein the liquid fuel controls the balance of neutrons in the core;
a reservoir outside of the core containing the liquid fuel;
a connecting passage between the reservoir and the primary passage;
a trap in the connecting passage between the reservoir and the primary passage;
a region control passage connecting a control fluid supply with the primary passage, where the control fluid supply includes control fluid, wherein the control fluid differs from the liquid fuel;
a reservoir control passage connecting the control fluid supply with the reservoir;
a control system,
wherein the control system is configured to move liquid fuel from the core toward the reservoir by displacing control fluid in the region control passage,
wherein the control system is configured to move liquid fuel from the reservoir toward the core by displacing control fluid in the reservoir control passage,
wherein the control system is configured to monitor a volume of the liquid fuel in the primary passage and adjust the volume of the liquid fuel to control a reactivity of the nuclear reactor; and,
a cooling system configured to move a coolant fluid through a coolant passage in the core, wherein the core has a plurality of jets arranged around the annular cylinder, the jets configured to introduce flow around an interior of the annular cylinder.

15. A nuclear reactor comprising:
a core having an associated primary passage in the shape of an annular cylinder, the primary passage containing a liquid fuel, wherein the liquid fuel controls the balance of neutrons in the core;
a reservoir outside of the core containing the liquid fuel;
a connecting passage between the reservoir and the primary passage;
a trap in the connecting passage between the reservoir and the primary passage;
a region control passage connecting a control fluid supply with the primary passage, wherein the control fluid supply includes control fluid, wherein the control fluid differs from the liquid fuel;
a reservoir control passage connecting the control fluid supply with the reservoir;
a control system,
wherein the control system is configured to move liquid fuel from the core toward the reservoir by displacing control fluid in the region control passage,
wherein the control system is configured to move liquid fuel from the reservoir toward the core by displacing control fluid in the reservoir control passage,
wherein the control system is configured to monitor a volume of the liquid fuel in the primary passage and adjust the volume of the liquid fuel in the core to control a reactivity of the nuclear reactor; and, a cooling system configured to move a coolant fluid through a coolant passage in the core, wherein the core has a plurality of jets arranged around the annular cylinder, the jets configured to introduce flow around an interior of the annular cylinder.

\* \* \* \* \*